United States Patent Office 3,729,319
Patented Apr. 24, 1973

3,729,319
OPTICAL SUPERSENSITISATION OF SILVER HALIDE EMULSIONS WITH THREE CYANINE DYES
Robin Jefferson and Christopher John Palles, Ilford, Essex, England, assignors to Ilford Limited, Ilford, Essex, England
Filed June 2, 1971, Ser. No. 149,171
Int. Cl. G03c 1/14
U.S. Cl. 96—124         4 Claims

ABSTRACT OF THE DISCLOSURE

This invention relates to photographic light-sensitive material which comprises a silver halide emulsion containing a super-sensitizing combination. The latter consists of three different dyestuffs. It is useful for increasing the sensitivity of a green sensitised emulsion.

---

Figure 1:
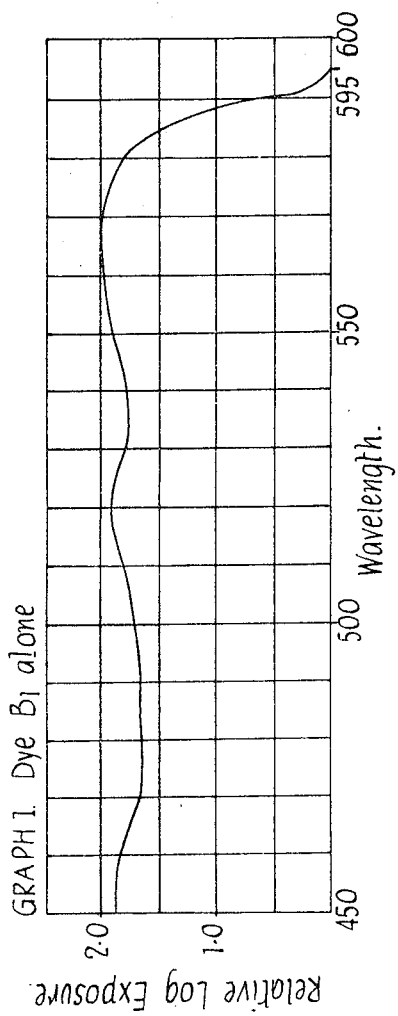

Photographic silver halide emulsions have a certain natural sensitivity to light, but this is restricted to a short range of wavelengths in the ultra-violet and/or blue regions of the spectrum. The effect of incorporating a sensitising dye is to impart to the emulsion sensitivity to light of other wavelengths. It has been known for some years that by incorporating in the emulsion, together with the sensitising dye, a second substance or a second and third substance which may or may not themselves be sensitising dyes, there may sometimes be imparted to the emulsion an additional sensitivity beyond that which can be regarded as the sum effect of the separate substances. Combinations of sensitising dye and other substances which give this better result are known as super-sensitising combinations.

The present invention is based on the discovery of a new super-sensitising combination of the type just referred to.

According to the present there is provided a photographic silver halide emulsion which comprises a super-sensitising combination which consists of a sensitising dye of the general Formula I:

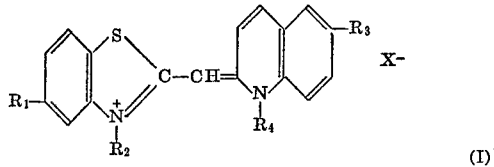

wherein $R_1$ and $R_3$ are hydrogen atoms or methyl groups, $R_2$ is a sulphoalkyl or carboxyalkyl group, $R_4$ is a lower alkyl group and X is an anion, or the corresponding zwitterion formed by the elimination of the anion X and the hydrogen atom of the sulphonic acid group together with a sensitising dye of the general Formula II:

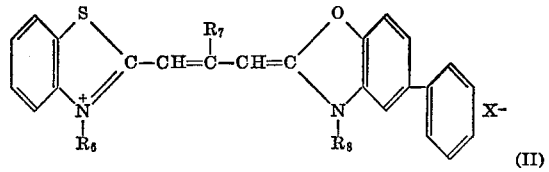

wherein $R_6$ is a carboxyalkyl or sulphoalkyl group, $R_7$ is a methyl or ethyl group and $R_8$ is a lower alkyl group and X is an anion, or the corresponding zwitterion formed by the elimination of the anion X and the hydrogen atom of the sulphonic acid together with a sensitising dye of the general Formula III:

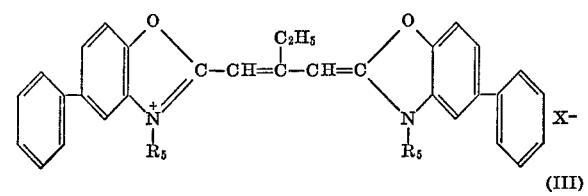

wherein $R_5$ is an alkyl or substituted alkyl group or the corresponding zwitterion formed by the elimination of the anion X and the hydrogen atom of the sulphonic acid when $R_5$ is a sulphoalkyl group.

By lower alkyl group is meant an alkyl group containing from 1 to 4 carbon atoms.

Examples of suitable substituted alkyl groups of $R_5$ are alkoxyalkyl, carboxyalkyl and sulphoalkyl.

From 0.01 g. to 0.3 g. of each sensitising dye per 1.5 g. mols of silver present in the emulsion can be conveniently used.

By use of a combination of dyes as just set forth a valuable effect is obtained and is illustrated by the specific examples which are set forth later herein. The super-sensitising combination as hereinbefore set forth finds particular use in increasing the sensitivity of a green-sensitised emulsion. Dyes of Formula I, II and III are in general green sensitisers and when a combination of these dyes is used in an emulsion an enhancement of the green sensitivity is obtained over the green sensitivity due to any one dye alone or due to a combination of any two of the three dyes. Moreover, the red speed of the dye of Formula II is considerably reduced in the combination. This is of value in colour photographic material because the green sensitive layer is required to have as low a red sensitivity as possible.

The super-sensitising combination of dyes as just set forth is of particular use in that form of colour photographic material where the emulsion comprises substantive colour couplers because, in general, the dyes used in the super-sensitising combination are resistant to the de-sensitising action of substantive colour couplers.

Furthermore, when the combination of all three dyes is present, the emulsion which contains the dyes is found to have improved storage properties both before exposure and after exposure.

The following examples will serve to illustrate the invention:

EXAMPLE 1

The following dyes were used:

Dye $A_1$ which is a dye of Formula I had the following formula:

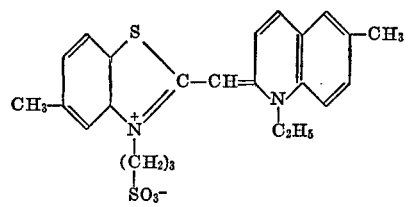

Dye $B_1$ which is a dye of Formula II had the following formula:

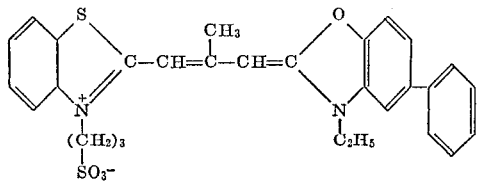

Dye $C_1$ which is a dye of Formula III had the following formula:

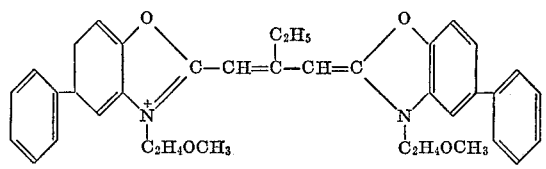

The dyes were added as shown in Table 1, to portions of a high speed silver iodobromide emulsion containing 5.4 mol. percent of silver iodide, after digestion of the emulsion, the quantity shown for each dye being the amount per 1½ g. mols of silver halide. Each portion was coated onto film strip. After exposure through a continuous wedge the strips were developed and the relative log speed of the emulsions were determined. The speeds are relative log speeds measured to light passing through a yellow filter, the term "relative log speed" being directly related to the logarithm of the reciprocal of the exposure in metre-candle-seconds required to produce a density of 0.1 above fog. A higher figure indicates a higher speed.

TABLE 1

| Dye $A_1$ | Dye $C_1$ | Dye $B_1$ | Relative log speed |
|---|---|---|---|
| 0.30 | | | 3.37 |
| | 0.30 | | 3.60 |
| | | 0.30 | 3.72 |
| | 0.25 | 0.25 | 3.70 |
| 0.25 | | 0.25 | 3.63 |
| 0.075 | 0.15 | 0.075 | 3.80 |

In order to demonstrate the improved storage properties of emulsions comprising the combination of all three dyes, unexposed film strips as just prepared were stored in a humidity cabinet for one week at 43° C. and 69% relative humidity. After incubation they were exposed and processed together with similar strips which had been stored for one week at 10° C. and 50% relative humidity. An accelerated latent image test was also carried out in which unexposed film strips as just prepared were exposed and then stored for one week at 43° C. and 69% relative humidity. These strips were processed together with the above strips which were exposed just prior to processing.

In Table 2 which follows the amount in g. per 1½ moles of silver halide of each of the dyes $A_1$ $B_1$ and $C_1$ contained in each strip is indicated by the figures on the left hand columns. The figures in the "Fog Change" column show the difference between the control strips fog and the incubated strips fog in one column and between the control strips fog (Inc.) and the strips which were subjected to the accelerated latent image process in the other column (A.L.I.). Similarly different figures are shown for the "Log Speed Change" and "Contrast Change."

TABLE 2

| | | | Fog change | | Log speed change | | Contrast change | |
|---|---|---|---|---|---|---|---|---|
| Dye $A_1$ | Dye $C_1$ | Dye $B_1$ | Incubation | A.L.I. | Incubation | A.L.I. | Incubation, percent | A.L.I. percent |
| .35 | | | +.02 | +.02 | +.02 | +.05 | +5 | +14 |
| | .35 | | +.01 | 0 | +.04 | 0 | −6 | +17 |
| | | .35 | +.01 | +.01 | 0 | +.02 | −1 | +28 |
| .25 | | .25 | +.01 | +.02 | +.04 | +.01 | +6 | +35 |
| .10 | .10 | .10 | 0 | +.02 | +.10 | −.01 | +4 | +6 |
| .075 | .15 | .075 | 0 | 0 | +.04 | −.01 | −5 | +1 |
| .15 | .075 | .075 | +.02 | +.01 | +.02 | +.03 | −4 | +4 |
| .075 | .075 | .15 | 0 | +.02 | +.04 | +.05 | −4 | +4 |

From Table 2 it may be seen that changes which have occurred in the fog and in the log speed of the emulsions due to both the incubation and the accelerated latent image tests are of the same order for both the dyes alone and in combination. For changes in contrast however, emulsion which contains the three dyes shows an improvement, especially on the accelerated latent image test. Changes in contrast must be minimised in order to maintain correct colour balance of integral tripack colour materials, during storage.

The presence of the magenta coupler had very little stripping action on any of the dyes as shown by the fact that on coating the dyes or dye mixture which had stood in the presence of magenta colour coupler for three hours, no loss of speed was observed.

TABLE 3

| Dyes contained in emulsion: | Relative speed loss |
|---|---|
| $A_1$, $B_1$, and $C_1$ | −.05 |
| $A_1$ | 00 |
| $C_1$ | 00 |
| $B_1$ | −.07 |

Figure 2:
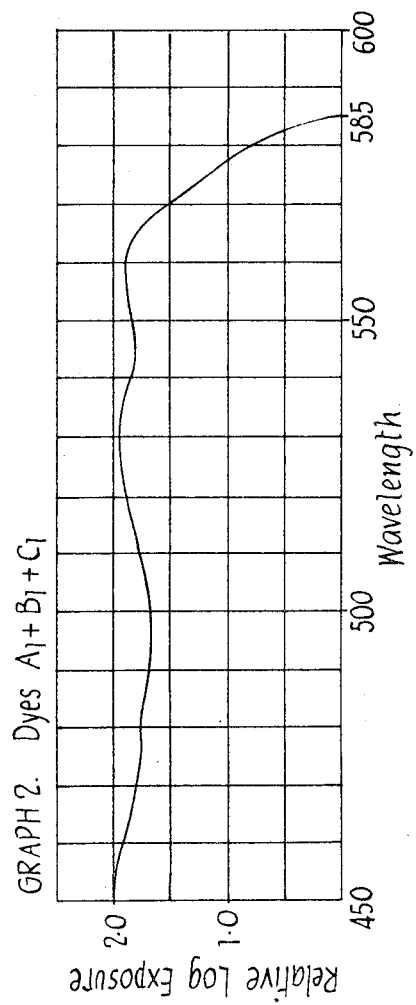

The reduction in the red speed of dye $B_1$ when in combination with dyes $A_1$ and $C_1$ is shown in the accompanying drawings. Graph 1 (FIG. 1) shows the wedge spectrogram of dye $B_1$ alone. This shows the large area of sensitivity beyond 580 nm. The area 580 to 600 nm. is very critical from the point of view of colour reproduction, this being the area of overlap between the red and green sensitive layers. It is preferred that there is some sensitivity up to 590 but to a controlled degree only. Graph 2 (FIG. 2) shows the wedge spectrogram of a mixture of dyes $A_1$, $B_1$ and $C_1$. This shows that the area of sensitivity beyond 580 nm. is considerably reduced.

In Examples 2-4 which follow the specified dyes singly and in combination were added to a similar high speed silver iodobromide emulsion as used in Example 1. The emulsions so produced were exposed, processed and evaluated as set forth in Example 1. The incubation tests were also carried out as described in Example 1.

The amount of dyes used in the emulsion are shown in the tables as g. per 1½ g. moles of silver halide in the emulsion.

EXAMPLE 2

The following dyes were used:
Dye $A_2$ which is a dye of Formula I had the following formula

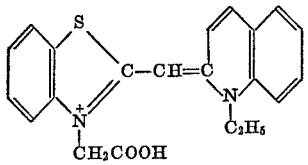

Dye $B_1$ of Example I.
Dye $C_2$ which is a dye of Formula III had the following formula

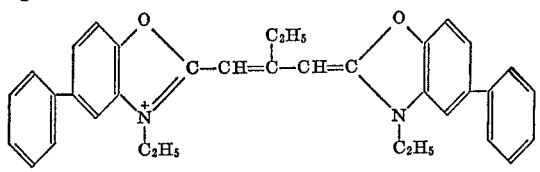

The results obtained are shown in Table 4.

TABLE 4

| Dye $A_2$ | Dye $C_2$ | Dye $B_1$ | Relative log speed |
|---|---|---|---|
| 0.30 | | | 3.17 |
| | 0.30 | | 3.50 |
| | | 0.30 | 3.60 |
| | 0.15 | 0.15 | 3.61 |
| 0.15 | | 0.15 | 3.52 |
| 0.075 | 0.15 | 0.075 | 3.68 |

The presence of magenta coupler had very little stripping action as is shown in Table 5.

TABLE 5

Dyes contained in emulsion:    Relative speed loss
    $A_2$ $B_1$ $C_2$ -------------------------------- 00
    A ---------------------------------------- −.03
    C ---------------------------------------- +.01
    B ---------------------------------------- 00

The incubation test results are shown in Table 6

TABLE 6.—INCUBATION TEST RESULTS

| | | | Fog change | | Log speed change | | Contrast change | |
|---|---|---|---|---|---|---|---|---|
| Dye $A_2$ | Dye $B_1$ | Dye $C_2$ | Incubation | A.L.I. | Incubation | A.L.I. | Incubation, percent | A.L.I., percent |
| 0.3 | | | +.01 | +.01 | −.08 | −.17 | −7 | +11 |
| | 0.3 | | +.02 | +.02 | −.03 | −.09 | 0 | +3 |
| | | 0.3 | +.01 | +.01 | 0 | +.02 | −1 | +24 |
| | 0.15 | 0.15 | 0 | 0 | −.03 | −.07 | −2 | +35 |
| 0.075 | 0.15 | 0.075 | +.02 | +.01 | +.02 | −.01 | −1 | +29 |

EXAMPLE 3

The following dyes were used:
Dye $A_2$ of Example 2
Dye $B_3$ which is a dye of Formula II had the following formula

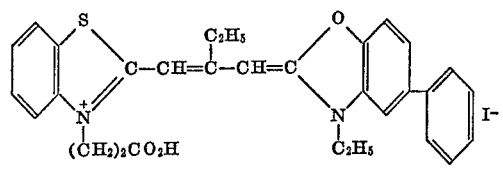

Dye $C_3$ which is a dye of Formula III had the following formula

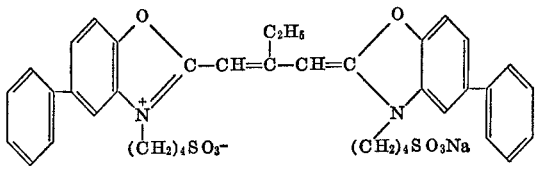

The results obtained are shown in Table 7.

TABLE 7

| Dye $A_2$ | Dye $C_3$ | Dye $B_3$ | Relative log speed |
|---|---|---|---|
| 0.30 | | | 3.17 |
| | 0.30 | | 3.50 |
| | | 0.30 | 3.22 |
| | 0.15 | 0.15 | 3.48 |
| 0.15 | | 0.15 | 3.37 |
| 0.075 | 0.15 | 0.075 | 3.50 |

The presence of magenta coupler had very little stripping action shown in Table 8.

TABLE 8

Dyes contained in emulsions:    Relative speed loss
    $A_2$ $B_3$ $C_3$ -------------------------------- 00
    $A_2$ ---------------------------------------- −.03
    $B_3$ ---------------------------------------- +.01
    $C_3$ ---------------------------------------- +.02

Incubation test results are shown in Table 9.

TABLE 9.—INCUBATION TEST RESULTS

| | | | Fog | | Log speed change | | Contrast change | |
|---|---|---|---|---|---|---|---|---|
| Dye $A_2$ | Dye $C_3$ | Dye $B_3$ | Incubation | A.L.I. | Incubation | A.L.I. | Incubation, percent | A.L.I., percent |
| 0.3 | | | +.01 | +.01 | −.08 | +.17 | −7 | +13 |
| | 0.3 | | 0 | +.01 | −.01 | +.01 | −1 | +53 |
| | | 0.3 | +.01 | +.01 | +.03 | +.05 | −12 | +21 |
| 0.15 | 0.15 | | +.02 | 0 | −.04 | +.09 | +2 | +37 |
| 0.15 | | 0.15 | +.01 | +.02 | −.03 | +.05 | −1 | +34 |
| 0.075 | 0.15 | 0.075 | 0 | +.01 | −.05 | +.01 | −1 | +31 |

EXAMPLE 4

The following dyes were used:
Dye $A_4$ which is a dye of Formula I had the following formula

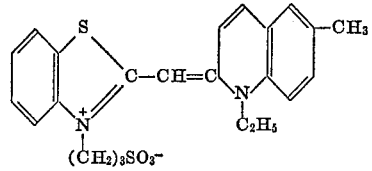

Dye $B_4$ which is a dye of Formula II had the following formula

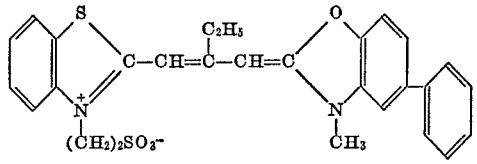

Dye C₄ which is a dye of Formula III had the following formula

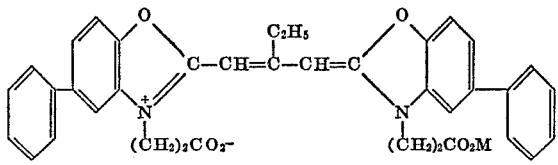

The results obtained are shown in Table 10.

TABLE 10

| Dye A₄ | Dye B₄ | Dye C₄ | Relative log speed |
|---|---|---|---|
| 0.30 | | | 2.96 |
| | 0.30 | | 3.52 |
| | | 0.30 | 3.54 |
| | 0.15 | 0.15 | 3.54 |
| 0.15 | | 0.15 | 3.34 |
| 0.075 | 0.15 | 0.075 | 3.58 |

The presence of magenta couplers had very little stripping action as shown in Table 11.

TABLE 11

Dyes contained in
emulsions:                      Relative speed loss
A₄+B₄+C₄ ---------------------------------- +.02
A₄ ------------------------------------------ +.06
B₄ ------------------------------------------ −.06
C₄ ------------------------------------------ +.07

The incubation tests results are shown in Table 12.

TABLE 12.—INCUBATION TEST RESULTS

| Dye A₄ | Dye C₄ | Dye B₄ | Fog change | | Log speed change | | Contrast change | |
|---|---|---|---|---|---|---|---|---|
| | | | Incubation | A.L.I. | Incubation | A.L.I. | Incubation, percent | A.L.I., percent |
| 0.3 | | | +.01 | 0 | −.11 | +.10 | −12 | +3 |
| | 0.3 | | 0 | 0 | +.17 | +.05 | −6 | +50 |
| | | 0.3 | 0 | 0 | +.07 | +.01 | −7 | +19 |
| | 0.15 | 0.15 | +.01 | +.01 | −.02 | 0 | +4 | +46 |
| 0.075 | 0.15 | 0.075 | +.01 | +.01 | −.02 | −.03 | −4 | +27 |

From Tables 6, 9 and 12 it may be seen that changes which have occurred in the fog and in the log speed of the emulsions due to both the incubation and the accelerated latent image tests are improved when the three dye combination is present.

We claim:
1. A photographic silver halide emulsion which contains a super-sensitising combination which comprises
(1) a sensitising dyestuff of the formula

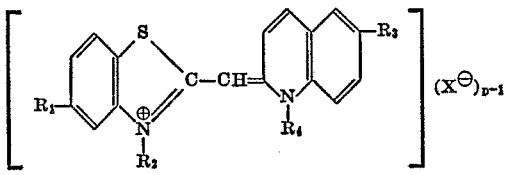

wherein $R_1$ and $R_3$ each represents a member selected from the group consisting of a hydrogen atom and a methyl group, $R_2$ represents a sulphoalkyl group or a carboxyalkyl group, $R_4$ represents a lower alkyl group, X represents an anion and p is 1 in the case of a betaine-like molecular structure caused by the presence of a sulfonic acid group in the radical $R_2$, and is 2 in the case of a non-betaine-like molecular structure, (2) a sensitising dyestuff of the formula

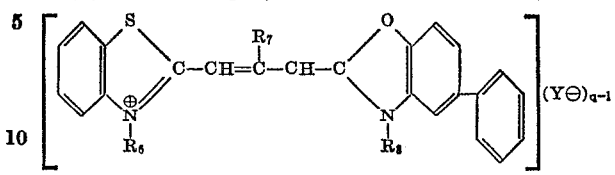

wherein $R_6$ represents a carboxyalkyl group or a sulphoalkyl, $R_7$ represents a methyl or ethyl group, $R_8$ represents a lower alkyl group, Y represents an anion, and q is 1 in the case of a betaine-like molecular structure caused by the presence of a sulphonic acid group in the radical $R_6$ and is 2 in the case of a non-betaine-like molecular structure, and (3) a symmetrical bis-benzoxazole sensitising dyestuff of the formula

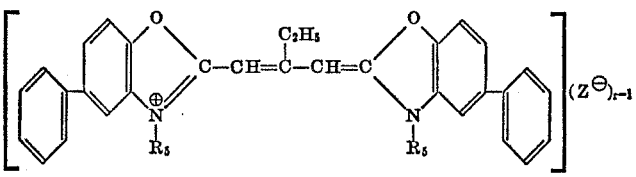

wherein $R_5$ represents a member selected from the group consisting of an alkyl group, an alkoxyalkyl group, a carboxyalkyl group and a sulphoalkyl group, Z represents an anion and r is 1 in the case of a betaine-like molecular structure caused by the presence of a sulphonic acid group or a carboxylic acid group in the radical $R_5$ and r is 2 in the case of a non-betaine-like molecular structure.

2. A photographic silver halide emulsion as claimed in claim 1 which comprises
(1) a sensitising dyestuff of the formula

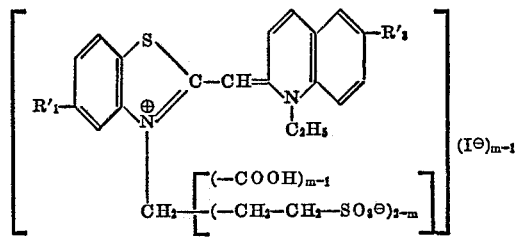

wherein $R_1'$ and $R_3'$ each represents a member selected from the group consisting of a hydrogen radical and a methyl group and m is 1 or 2, (2) a sensitising dyestuff of the formula

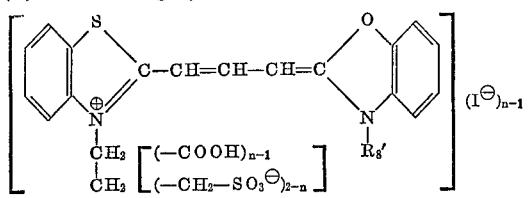

wherein $R_7'$ and $R_8'$ each represents a member selected from the group consisting of a methyl group and an ethyl group and $n$ is 1 or 2, and (3) a symmetrical bis-benzoxazole sensitising dyestuff of the formula

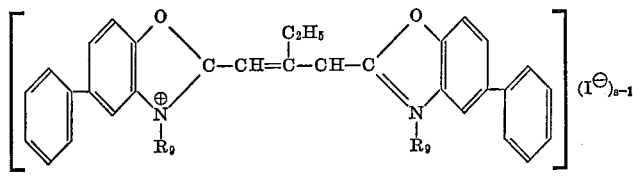

wherein $s$ equals 1 or 2, (a) $R_9$ represents each a member selected from the group consisting of an ethyl group and a β-methoxy ethyl group if $s$ equals 2, and (b) $R_9$ represents a member selected from the group consisting of a lower alkyl sulfonic acid group an a lower alkyl carboxylic acid group, the acid group of the radical $R_9$ being bound to the quaternary nitrogen in a betaine-like molecular structure, if $s$ equals 1.

3. A photographic emulsion as claimed in claim 1, which comprises 0.01 to 3 g. of each sensitising dyestuff per 1.5 gram equivalents of silver present in the emulsion.

4. A photographic emulsion as claimed in claim 1, which contains a magenta colour coupler.

References Cited
UNITED STATES PATENTS

| | | | |
|---|---|---|---|
| 2,166,938 | 7/1939 | Carroll | 96—124 |
| 3,463,640 | 8/1969 | Ficken et al. | 96—124 |
| 3,580,724 | 5/1971 | Sato et al. | 96—124 |

J. TRAVIS BROWN, Primary Examiner

U.S. Cl. X.R.

96—100

UNITED STATES PATENT OFFICE
CERTIFICATE OF CORRECTION

Patent No. 3,729,319      Dated April 24, 1973

Inventor(s) Robin Jefferson and Christopher John Palles

It is certified that error appears in the above-identified patent and that said Letters Patent are hereby corrected as shown below:

Insert in the Heading of the Patent, after the Serial No.,

--Claims priority, application Great Britain, June 4, 1970, 27073/70--.

Signed and sealed this 12th day of March 1974.

(SEAL)
Attest:

EDWARD M. FLETCHER, JR.
Attesting Officer

C. MARSHALL DANN
Commissioner of Patents